Sept. 6, 1932.  H. SIDGREAVES  1,876,353
MACHINE TOOL COMPENSATING MECHANISM
Filed April 29, 1930   3 Sheets-Sheet 1
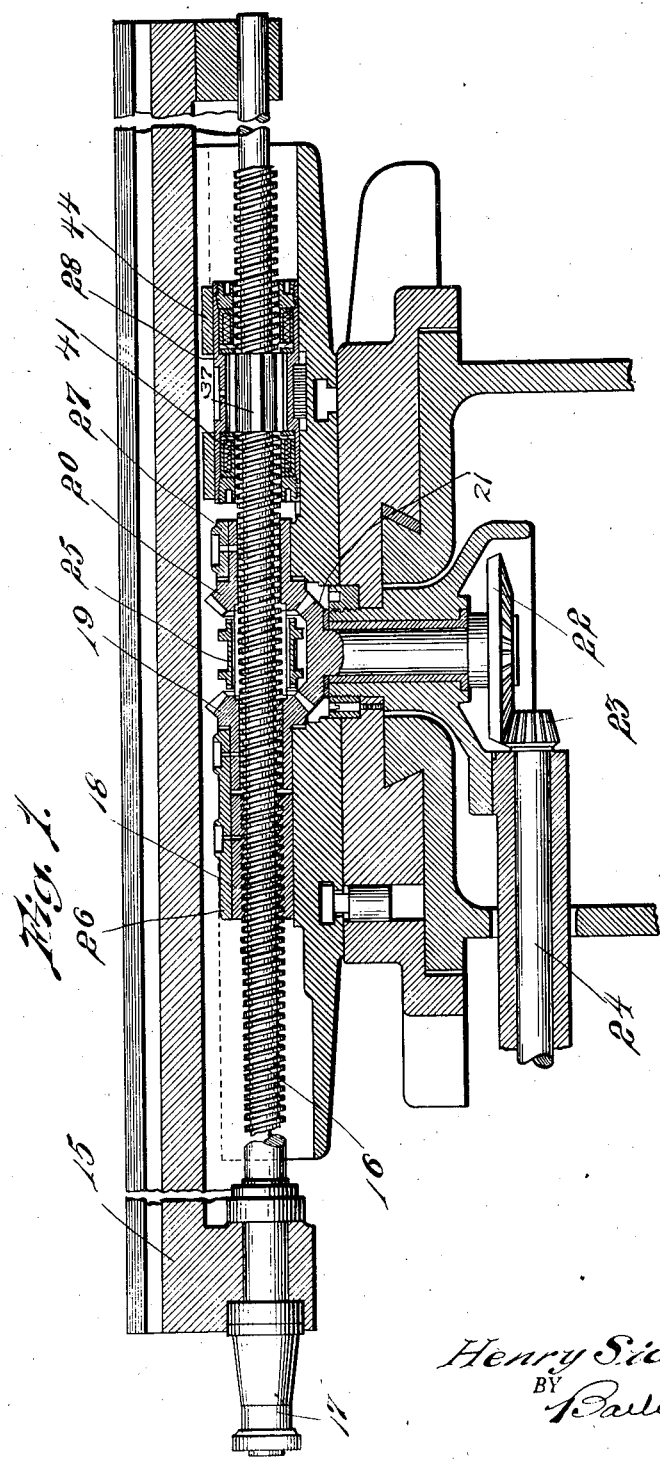
INVENTOR.
Henry Sidgreaves
BY Barlow & Barlow
ATTORNEYS.

Sept. 6, 1932. H. SIDGREAVES 1,876,353
MACHINE TOOL COMPENSATING MECHANISM
Filed April 29, 1930 3 Sheets-Sheet 2
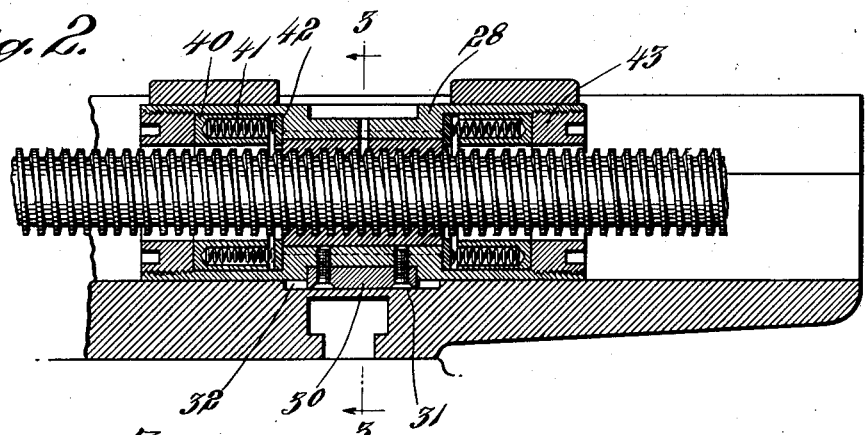
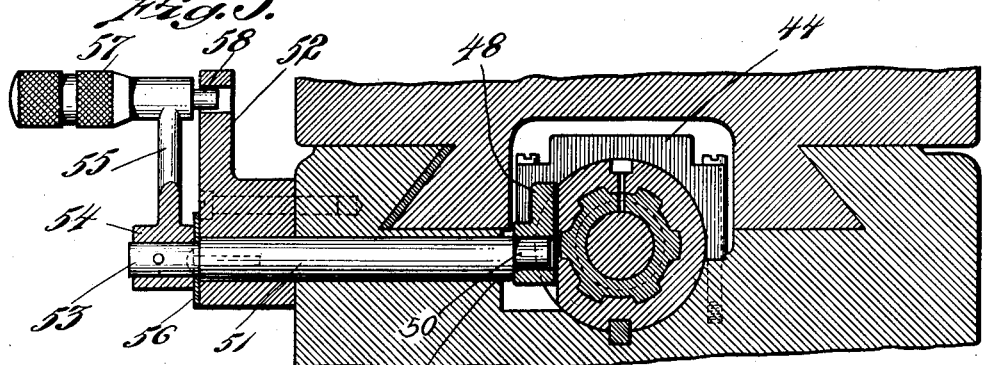
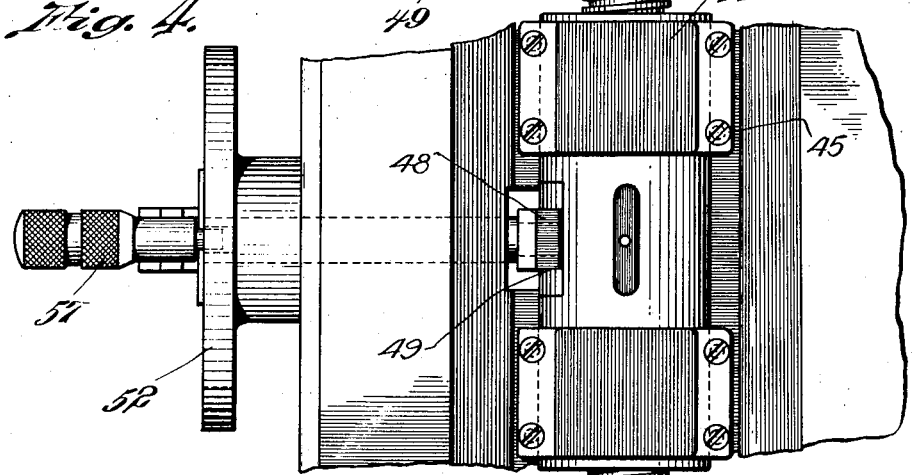
INVENTOR.
Henry Sidgreaves
BY Barlow & Barlow
ATTORNEYS.

Sept. 6, 1932.  H. SIDGREAVES  1,876,353
MACHINE TOOL COMPENSATING MECHANISM
Filed April 29, 1930   3 Sheets-Sheet 3
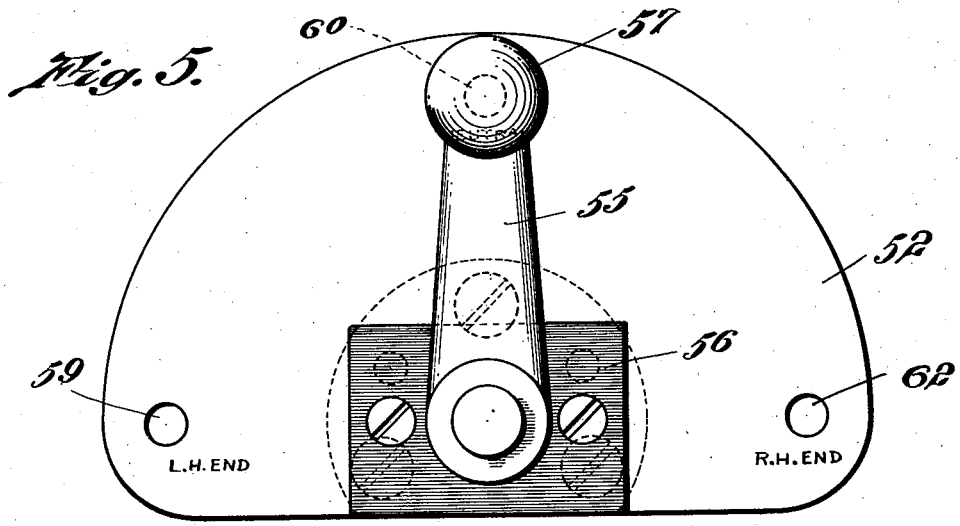
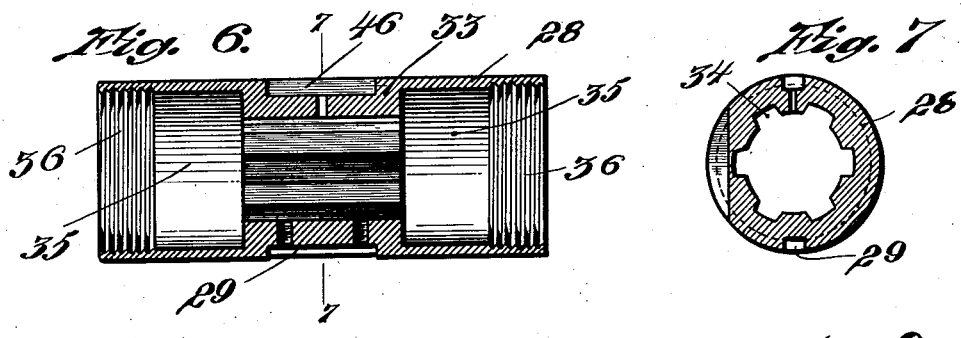
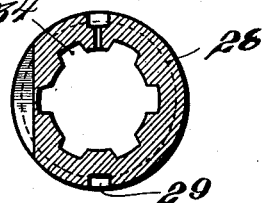
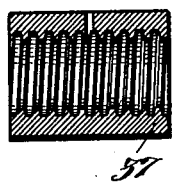
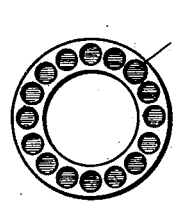
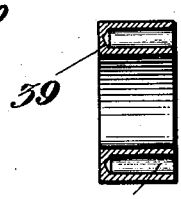
INVENTOR.
Henry Sidgreaves
BY Barlow & Barlow
ATTORNEYS.

Patented Sept. 6, 1932

1,876,353

UNITED STATES PATENT OFFICE

HENRY SIDGREAVES, OF PAWTUCKET, RHODE ISLAND, ASSIGNOR TO BROWN & SHARPE MANUFACTURING COMPANY, OF PROVIDENCE, RHODE ISLAND, A CORPORATION OF RHODE ISLAND

MACHINE TOOL COMPENSATING MECHANISM

Application filed April 29, 1930. Serial No. 448,248.

My present invention relates to metal working machines, and has particular reference to improvements in the mechanism for moving the tables or work supports in such machines.

The tables or work supports are ordinarily moved by screw and nut mechanism which is difficult to machine and to fit closely, and which wears during the life of the machine, so that there is a small amount of endwise axial play of the screws with respect to the nut. This play or looseness lowers the accuracy of the work settings; and the resulting back lash permits chattering or vibration to take place, the latter feature being particularly objectionable in milling machines. Moreover, when the tool is cutting in the same direction that the work is fed, the looseness or play permits an objectionable forward movement of the work due to the bite of the tool. The principal object of my invention is to provide compensating mechanism which will automatically and continuously prevent this relative play of the screw with respect to the nut.

Since the normal operation of a metal working machine utilizes a portion only of the available stroke and the operating stresses are not uniform, the wear of the screw is not uniform throughout its length. Another object of the invention is to construct the compensating mechanism to automatically compensate for relative wear of the nut and the screw and the uneven wear of the screw.

With these and other objects and advantageous features in view, the invention consists in a novel arrangement of parts more fully disclosed in the detailed description following, in conjunction with the illustrative drawings, and more particularly pointed out in the appended claims.

In the drawings:

Fig. 1 is a sectional elevation of the operating mechanism for reciprocating a milling machine table;

Fig. 2 is an enlarged sectional elevation of the novel compensating mechanism therefor;

Figs. 3, 4 and 5 are views illustrating the manual control for the compensating mechanism, and respectively disclose a section on the line 3—3 of Figure 2, a plan view, and a side elevation;

Fig. 6 is a central sectional view through the compensating sleeve;

Fig. 7 is a section on the line 7—7 of Figure 6;

Figs. 8 and 9 are respectively a central section and an end view of the compensating nut;

Figs. 10 and 11 are respectively an end view and a central section of the compensating spring retainer; and Fig. 12 is an end view of the manual control eccentric.

It has been found desirable to utilize a compensating mechanism for eliminating play and back lash in the screw and nut mechanism used for reciprocating the tables and work supports of milling machines and the like. I have devised a simple construction which utilizes a shiftable compensating nut for holding the screw in continuous contact with the threads of the operating nut in the direction of work travel, and I have utilized manually controlled spring pressed members for yieldingly forcing the compensating nut into holding engagement with the operating screw; and the following is a detailed description of a constructional form of compensating mechanism which embodies the principles of my invention.

Referring to the drawings, the table or work support 15, which may be of any usual type, has the operating screw 16 rotatably mounted therein, the screw having the usual stub shaft 17 projecting forwardly for mounting a handwheel for manual operation. The screw 16 is threaded in the fixed nut 18, secured to the machine frame, and is selectively rotated in either direction through a chain of bevel gears 19, 20, 21, 22, 23 of the usual type by the power shaft 24, the manually operated sleeve clutch 25 being shiftable to control the direction of rotation. Caps 26, 27 of any desired type are provided, having oil wells and oil ports which communicate with corresponding oil ports in the fixed nut and the shafts of gears 19, 20, to lubricate the operating screw in the usual manner.

The novel compensating mechanism is axially displaced along the operating screw, and includes a compensating sleeve 28 which is mounted concentric with the operating screw and is axially movable with respect thereto. To guide this axial movement, the sleeve is provided with a rectangular recess 29 into which a key 30 is fitted and secured as by screws 31, the key 30 being slidably seated in a guideway 32 milled or otherwise formed in the machine frame.

As best shown in Figure 6, the sleeve 28 has a central section 33 of relatively small diamter, splined as indicated at 34, and is bored to provide housing sections 35 on each side of the central section, the ends of the housing sections being threaded, as at 36, for a purpose hereinafter described.

The central section 33 slidingly receives a nut 37 which is also splined, as at 38, to cooperate with the splines 34 of the sleeve and prevent rotation of the nut in the sleeve. The nut is slightly less in length than the central section 33, and is threaded on the operating screw 16.

Each housing section 34 contains an annular spring retainer 39 having a plurality of axial openings 40 each of which houses a strong spiral spring 41; two annular pressure rings 42 are provided adjacent the central section 33 and the nut 37 to receive the thrust of the opposed springs 41. Closure plugs 43 screw-threadedly engage the sleeve threads 36 to lock the spring retainers, springs, and pressure rings within the sleeve.

The sleeve is retained in position by sleeve caps 44 secured to the machine frame, as by screws 45, and is provided with an oil well 46 to supply lubricant to the nut 37 and the operating screw through communicating oil ports of the usual type.

Referring now to Figures 3 and 4, it will be noted that the compensating sleeve is provided with a surface recess or shift slot 47 in which a sleeve shift block 48 is slidingly positioned. The shift block has a circular bore 49 into which an eccentric 50 is received, the eccentric being preferably integral with a control shaft 51 which is suitably mounted in the machine frame.

The control shaft 51 extends through a suitable opening or bore in a control bracket 52 which is secured to the machine frame, and has a reduced end 53 to which the shaft end 54 of the manual control lever 55 is keyed, a lock plate 56 being mounted on the reduced end and secured to the bracket to lock the shaft 51 in place. The control lever 55 has the usual spring lock handle 57, the spring pressed lock pin 58 being adapted to selectively enter suitable openings 59, 60 and 61, in the control bracket 52.

The operation of the compensating mechanism may now be explained:

The parts being assembled as shown in Figures 2 and 3, the compensating sleeve and the compensating nut cannot rotate, but the compensating sleeve may be shifted axially with respect to the compensating nut by turning the manual control lever to the right or the left, depending on the direction of travel of the table or work support. This turning of the manual control lever moves the sleeve shift block and therefore causes the compensating sleeve to move to the right or left as desired. This movement compresses one set of springs and releases the opposed set of springs, thus causing the pressure ring acted upon by the compressed set of springs to engage with the adjacent end of the compensating nut and yieldingly force it into contact with the operating screw.

When the cutter is cutting in the direction opposite to the feeding of the work, the back lash is negligible, and the compensating nut may be left in neutral position. When the cutter is rotating in the direction that the work is fed, the compensating nut is shifted in the same direction, and the operating screw is firmly held against the fixed nut, thus eliminating all back lash and play. If the direction of feed is reversed, the control lever is correspondingly shifted, and the other set of springs yieldingly forces the compensating nut in the opposite direction. When the control lever is moved to neutral position, the position indicated in Figure 5, the springs force the pressure rings into contact with the sides of the central sleeve section, and the compensating nut is housed within the central section and is not forced against the operating screw in either direction.

Since the pressure of the compensating nut against the operating screw is quite heavy, the operating handle is preferably placed in neutral position when moving the table or work support by hand, thus relieving the pressure on the nut and permitting easy manual rotation of the operating screw.

My improved construction therefore utilizes a small number of parts, is easily constructed and easily mounted in a milling machine or the like, and automatically eliminates back lash and play by forcing the operating screw axially in the direction of feed. The use of yielding springs permits a relative flexibility which compensates for uneven wear of the screw and for slight variations in the pitch or lead of the operating screw and nut threads.

While I have described certain construction forms which embody the principles of my invention, it is obvious that other desired changes in arrangement may be made within the spirit and the scope of the invention as defined in the appended claims.

I claim:

1. In a machine tool, a base, a movable support, a rotatable screw member connected to said movable support for reciprocation thereof, a nut member mounted in said base and threadedly engaging said screw member, means for holding said movable nut against rotation and yieldable means engaging one of said members and axially movable to axially shift said engaged member in either direction, and means for adjusting the yieldable means for varying the engaging pressure thereof in either direction.

2. In a machine tool, a base, a movable support, a rotatable screw connected to said movable support for reciprocation thereof, a sleeve mounted on said base, a nut splined in said sleeve and threadedly engaging said screw and axially shiftable with respect to said sleeve, and means including a plurality of separate resilient elements housed in said sleeve and engageable with each side of said nut for axially shifting said nut.

3. In a machine tool, a base, a movable support, a rotatable screw connected to said movable support for reciprocation thereof, a sleeve mounted on said base, a nut splined in said sleeve and threadedly engaging said screw and axially shiftable with respect to said sleeve, means including resilient elements housed in said sleeve on either side of said nut and engageable with either side of said nut to axially shift said nut, and means for selectively placing the nut shifting means on one side in engagement with said nut and simultaneously removing the pressure on the other side of said nut.

4. In a machine tool, a base, a movable support, a rotatable screw connected to said movable support for reciprocation thereof, a sleeve mounted on said base, a nut splined in said sleeve and threadedly engaging said screw and axially shiftable with respect to said sleeve, spring containers housed in said sleeve on either side of said nut, pressure rings on either side of said nut engageable therewith, springs in said containers engaging said pressure rings, and means for shifting one pressure ring axially to permit engagement of the other pressure ring with said nut.

5. In a machine tool, a base, a movable support, a rotatable screw connected to said movable support for reciprocation thereof, a sleeve mounted on said base having a central section, a movable nut splined in said central section and threadedly engaging said screw, annular spring containers mounted in said sleeve on either side of said central section, annular pressure rings mounted in said sleeve on either side of and adjacent said central section, springs in said containers engaging said annular pressure rings, and means for axially shifting said sleeve, whereby one pressure ring is moved and one set of springs is compressed while the other set of springs acts on the associated pressure ring to axially shift the movable nut.

6. In a machine tool, a base, a movable support, a rotatable screw connected to said movable support for reciprocation thereof, a stationary nut mounted on said base and threadedly engaging said screw, a sleeve mounted on said base having a central section, a movable nut splined in said central section and threadedly engaging said screw, annular spring containers mounted in said sleeve on either side of said central section, annular pressure rings mounted in said sleeve on either side of and adjacent said central section, springs in said containers engaging said annular pressure rings, and means for axially shifting said sleeve, whereby one pressure ring is moved and one set of springs is compressed while the other set of springs acts on the associated pressure ring to axially shift the movable nut.

7. In a machine tool, a base, a movable support, a rotatable screw connected to said movable support for reciprocation thereof, a sleeve mounted on said base, a nut splined in said sleeve and threadedly engaging said screw and axially shiftable with respect to said sleeve, spring containers housed in said sleeve on either side of said nut, springs in said containers, and means for shifting said sleeve to cause the springs in one container to exert pressure on one side of said nut.

8. In a machine tool, a base, a movable support, a rotatable screw connected to said movable support for reciprocation thereof, a sleeve mounted on said base, a nut in said sleeve engaging said screw, means for preventing relative rotation of said nut and sleeve but permitting axial shifting of the same with reference thereto, springs in said sleeve on either side of said nut and means for removing the pressure of one of the springs from one side of said nut.

9. In a machine tool, a base, a movable support, a rotatable screw connected to said movable support for reciprocation thereof, a sleeve mounted on said base, a nut in said sleeve engaging said screw, means for preventing relative rotation of said nut and sleeve but permitting axial shifting of the same with reference thereto, springs in said sleeve on either side of said nut and means for removing the pressure of both of said springs on said nut from both sides thereof for neutral position.

10. In a machine tool, a base, a movable support, a rotatable screw connected to said movable support for reciprocation thereof, a sleeve mounted on said base, a nut in said sleeve engaging said screw, means for preventing relative rotation of said nut and sleeve but permitting axial shifting of the same with reference thereto, springs in said sleeve on either side of said nut and means independent of said springs for positively removing their pressure from said nut.

In testimony whereof I affix my signature.

HENRY SIDGREAVES.